US008789255B2

(12) United States Patent
Wu

(10) Patent No.: US 8,789,255 B2
(45) Date of Patent: Jul. 29, 2014

(54) MACHINE FOR FORMING EYELETS IN APPAREL HANGTAGS

(75) Inventor: Dongchun Wu, Guandong (CN)

(73) Assignee: Avery Dennison Corporation, Glendale, CA (US)

( * ) Notice: Subject to any disclaimer, the term of this patent is extended or adjusted under 35 U.S.C. 154(b) by 1119 days.

(21) Appl. No.: 12/775,061

(22) Filed: May 6, 2010

(65) Prior Publication Data

US 2011/0271510 A1 Nov. 10, 2011

(51) Int. Cl.
*B21D 39/03* (2006.01)
*B23P 11/00* (2006.01)

(52) U.S. Cl.
USPC .................. 29/430; 29/716; 29/798; 29/38 R; 29/36; 29/431; 227/18; 227/19; 227/39; 227/41; 227/48

(58) Field of Classification Search
USPC ................... 29/716, 798, 38 R, 36, 430–432; 227/18, 19, 39, 41, 48, 50
See application file for complete search history.

(56) References Cited

U.S. PATENT DOCUMENTS 1,355,457 A * 10/1920 Fine ................................ 227/76
1,782,086 A 11/1930 Allen
2,443,682 A 6/1948 Knott

FOREIGN PATENT DOCUMENTS

WO PCT/US98/05909 * 10/1998 ................ B25C 1/04

* cited by examiner

*Primary Examiner* — Peter DungBa Vo
*Assistant Examiner* — Jeffrey T Carley
(74) *Attorney, Agent, or Firm* — Avery Dennison Corporation

(57) ABSTRACT

A machine and method for punching an aperture through a hangtag and securing a two-piece eyelet to the same is disclosed. The machine has a frame, a table, a platform, a plurality of hangtag holders, a loading station, a punching station, an eyeleting station, and an unloading station.

18 Claims, 6 Drawing Sheets

MACHINE FOR FORMING EYELETS IN APPAREL HANGTAGS

FIELD OF THE INVENTION

The present invention relates to a machine that automates the process of punching an aperture in a hangtag and securing a two-piece eyelet to the hangtag. The present invention also relates to a method of using the machine.

BACKGROUND OF THE INVENTION

The use of eyelets for strengthening apertures in cards, tags, tarps, tie-downs and various other articles is well known. An extremely common application of eyelets is the use of eyelets to strengthen hangtags. Hangtags are used by the retail industry to provide information relating to the merchandise the hangtags are attached to. Such information may include the price and Universal Product Code ("UPC") of the merchandise, the manufacturer of the merchandise, merchandise care instructions, and merchandise rebate or registration instructions. Hangtags are commonly attached to merchandise by way of looping a piece of string through an aperture provided in the hangtag. However, this method of attachment is problematic, as there exists a high probability that the piece of string will rip through the thin material that hangtags are often made out of.

One approach to solving this problem involves providing a one-piece eyelet within the aperture to bolster the strength of the aperture. Eyelets commonly come in either a one-piece or two-piece structure. Directing attention towards FIG. 7, a one-piece eyelet 200 is shown. The one-piece eyelet 200 has a tubular body 210. A disk 205 extends radially outward from one end of the tubular body 210. The disk 205 is one piece with the tubular body 210. An opening 215 is provided in the center of the disk 205. The opening 215 extends through the entirety of the one-piece eyelet 200.

Referring now to FIG. 8, the one-piece eyelet 200 is shown in use. The tubular body 210 is inserted into an aperture 290 of a hangtag 220 such that the disk 205 is flush with the surface of the hangtag 220 surrounding the aperture 290. A small section 250 of the tubular body 210 extends from the opposite side of the aperture 290. This small section 250 of the tubular body 210 is flared to cause the small section 250 of the tubular body 210 to lie flat against the hangtag 220, thereby securing the one-piece eyelet 200 within the aperture 290.

While this solution does provide additional strength to the hangtag aperture, there still exists a possibility of the one-piece eyelet becoming dislodged from the aperture, as the flared portion of the tubular body is often relatively small. Once the one-piece eyelet is dislodged from the aperture, the hangtag reinforced with a one-piece eyelet is just as prone to tearing as a non-reinforced hangtag. This problem can be overcome by providing a two-piece eyelet to reinforce the hangtag aperture.

Referring now to FIG. 9, a two-piece eyelet 320 is shown in use. The two-piece eyelet 370 is very similar to the one-piece eyelet 200, in that the two-piece eyelet 370 has an eyelet 320 having a tubular body 325, a disk 310, and an opening 315. The only difference between the one-piece eyelet 200 and the two-piece eyelet 370 is that the two-piece eyelet 370 is provided with a washer 335. When a small section 330 of the tubular body 325 is flared, the small section 330 of the tubular body 325 is flared over the washer 335, thereby securing both the washer 335 and the eyelet 320 to an aperture 300 extending through the hangtag 260 to create the two-piece eyelet 370. A two-piece eyelet is considerably more robust than a one-piece eyelet, as the washer provides additional reinforcement to the flared portion of the tubular body, thereby preventing the two-piece eyelet from becoming dislodged from the aperture.

Current automated production methods for producing eyeleted hangtags are unsatisfactory, as they are only suited to the production of hangtags having a one-piece eyelet. The only method of attaching two-piece eyelets to hangtags is by way of a labor-intensive manual process that is often performed where inexpensive labor is available. Unfortunately, the use of this manual process often leads to a reduction in quality as well as worker injury. The existing process involves, first, punching apertures in hangtags on a flat bed die cutting machine. The hangtags are then delivered to a worker. Working from one side of the hangtag face, the worker manually inserts an eyelet into the hangtag aperture. Then, working from the opposite side of the hangtag face, the worker places a washer over the eyelet already inserted into the hangtag aperture. The worker completes the operation by using a machine to flare the eyelet over the washer, thereby creating a two-piece eyelet secured to the hangtag.

Therefore, what is needed is an improved method of securing a two-piece eyelet to a hangtag that eliminates worker injury and increases productivity and quality.

BRIEF SUMMARY OF THE INVENTION

By providing an automated method of securing a two-piece eyelet to a hangtag, the present invention provides several advantages over the manual labor process described above.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention relates to a machine for punching an aperture through a hangtag and securing a two-piece eyelet to the same. The machine has a frame. A table is mounted to the frame. The table has a center. A platform is rotatably mounted to the center of the table. A plurality of hangtag holders are mounted to the platform just inside a periphery of the platform. A plurality of hangtag processing stations are mounted to the table just outside the periphery of the platform.

The present invention also relates to a method for creating a hangtag having a two-piece eyelet. The method comprises the steps of first, providing a machine having a plurality of four processing stations. The first station is a loading station, the second station is a punching station, the third station is an eyeleting station, and the fourth station is an unloading station. The loading station is equipped with a plurality of hangtags, while the eyeleting station is equipped with a plurality of washers and eyelets. A hangtag holder is advanced to each of the four processing stations. At the first processing station, a hangtag is placed onto the hangtag holder. At the second processing station, an aperture is punched in the hangtag. At the third processing station, a two-piece eyelet is secured within the aperture. Finally, at the fourth processing station, the hangtag having the two-piece eyelet is removed from the hangtag holder.

In another exemplary embodiment, a method for automatically punching an aperture through a hangtag and securing a two-piece eyelet to the same is provided. The method comprises the steps of, first, providing a machine having a frame, a table, a platform, a plurality of hangtag holders, a loading apparatus, a punching apparatus, an eyeleting apparatus, and an unloading apparatus. The loading apparatus is provided with a plurality of hangtags. The eyeleting apparatus is provided with a plurality of eyelets and a plurality of washers.

Next, advancing the platform to move the hangtag holders until one hangtag holder is aligned with the loading apparatus. The loading apparatus is then activated to place a single hangtag on the hangtag holder.

Then, advancing the platform to move the hangtag holder into alignment with the punching apparatus. The punching apparatus is activated to punch an aperture in the hangtag.

Next, advancing the platform to move the hangtag holder into alignment with the eyeleting apparatus. The eyeleting apparatus is then activated to secure an eyelet and a washer together through the hangtag aperture.

Finally, advancing the platform to move the hangtag holder into alignment with the unloading apparatus. The unloading apparatus is then activated to remove the completed hangtag from the hangtag holder.

In another exemplary embodiment, a method for producing an apparel hangtag and includes the steps of initially selecting a hangtag and then providing the hangtag from a supply and placing the hangtag on a rotary platform. Next, the platform is advanced to a punch station and an aperture is created in the hangtag. Then, the hangtag is advanced to the eyelet station where a washer and eyelet is supplied. Next, inserting the washer and eyelet into the aperture and flaring the washer and eyelet in the aperture to secure the eyelet and washer to the hangtag. Then, the hangtag with the eyelet is advanced to the delivery position where it is expelled.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Exemplary specifications for hangtags used in connection with and produced by the presently described invention are as follows:

| | |
|---|---|
| Hangtag Length: | 70-140 mm |
| Hangtag Width: | 0-90 mm |
| Hangtag Thickness: | 0.2-0.8 mm |
| Eyelet Diameter Range: | .5-5 mm |
| Eyelet Diameter Tolerance: | +/−1 mm |
| Production Rate: | 4,000 hangtags per hour |

Figure 1:
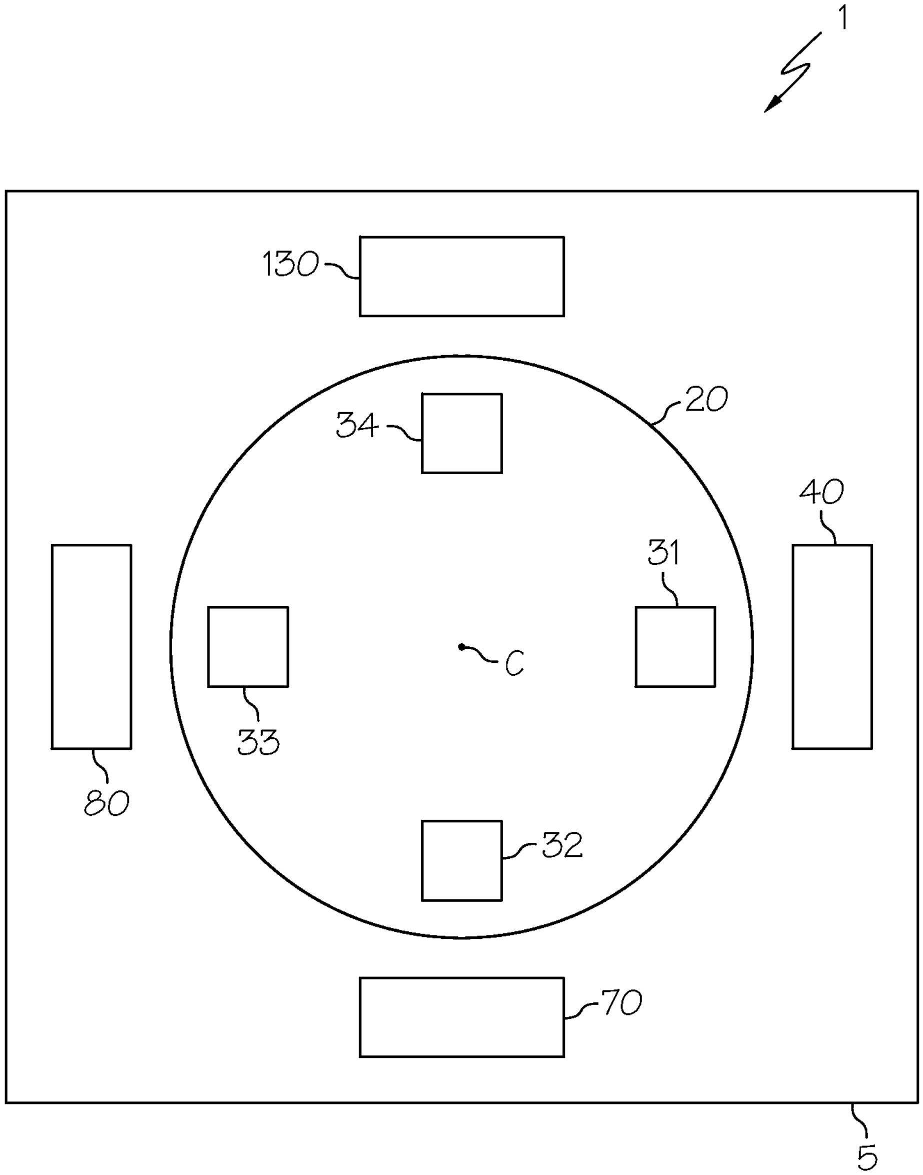
FIG. 1 is a top view of the present invention showing the various stations of the machine.
Figure 2:
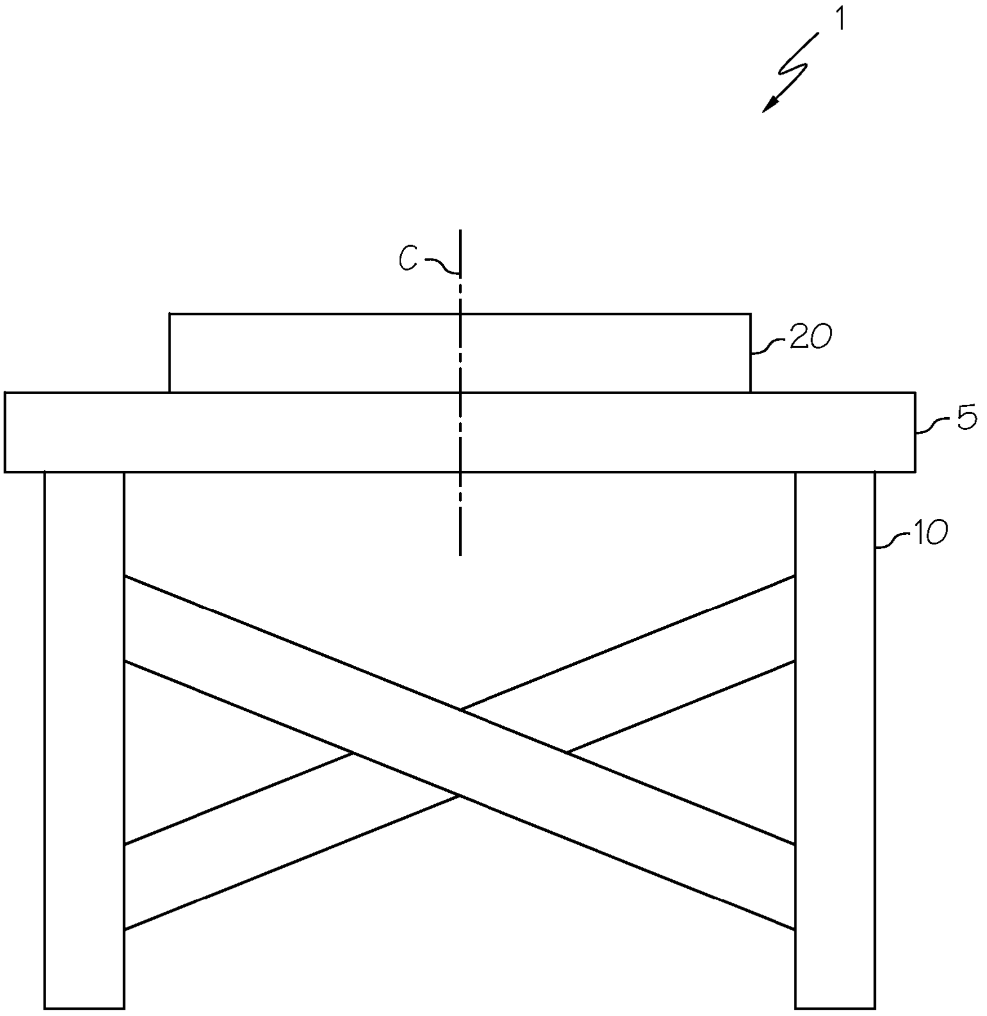
FIG. 2 is a top view of the present invention.

Referring now to FIGS. 1 and 2, a machine for punching an aperture through a hangtag and securing a two-piece eyelet to the same 1 is shown. The machine has a table 5 mounted on a frame 10. The table 5 has a center C. A rotary platform 20 is rotatably mounted to the table 5 at the table center C.

The machine 10 further has a plurality of four identical hangtag holders 31, 32, 33, 34. The hangtag holders 31, 32, 33, 34 are mounted to the rotary platform 20. The hangtag holders 31, 32, 33, 34 are positioned just inside the periphery of the rotary platform 20. One out of the plurality of hangtag holders 30 is positioned every ninety degrees along the periphery of the rotary platform 20 with respect to the table center C.

The machine 10 includes a plurality of four hangtag processing stations 40, 70, 80, 130. The stations 40, 70, 80, 130 are positioned just outside the periphery of the rotary platform 20. One out of the plurality of four processing stations 40, 70, 80, 130 is positioned every ninety degrees along the periphery of the rotary platform 20 with respect to the table center C. In the exemplary embodiment shown of the machine 1 in FIGS. 1 and 2, the first station is a loading station 40, the second station is a punching station 70, the third station is an eyeleting station 80, and the fourth station is an unloading station 130.

Figure 3:
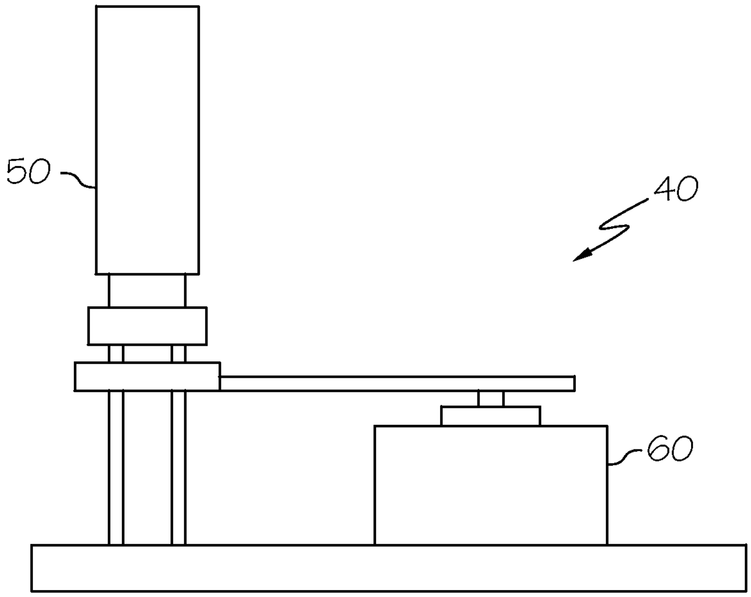
FIG. 3 is a side view of the present invention.

Referring now to FIG. 3, the loading station 40 includes a hangtag dispenser 50 and a first pick and place mechanism 60. The hangtag dispenser 50 may be adjusted to accept and dispense hangtags of different sizes and shapes. The first pick and place mechanism 60 is located adjacent to the hangtag dispenser 50. The first pick and place mechanism 60 is positioned to allow interaction with both the hangtag dispenser 50 and the plurality of hangtag holders 31, 32, 33, 34.

Figure 4:
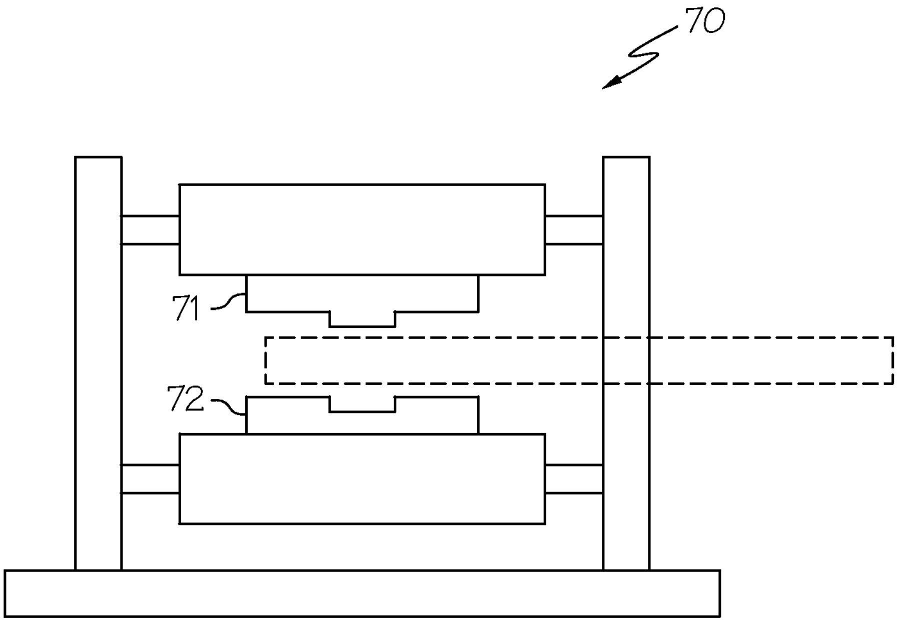
FIG. 4 is a side view of the punching station.

Referring now to FIG. 4, the punching station 70 includes a male punch unit 71 and a female punch unit 72. The male punch unit 71 is positioned over the female punch unit. The male punch unit 71 and the female punch unit 72 may be adjusted to give the punching station 60 the ability to create apertures of different sizes.

Figure 5:
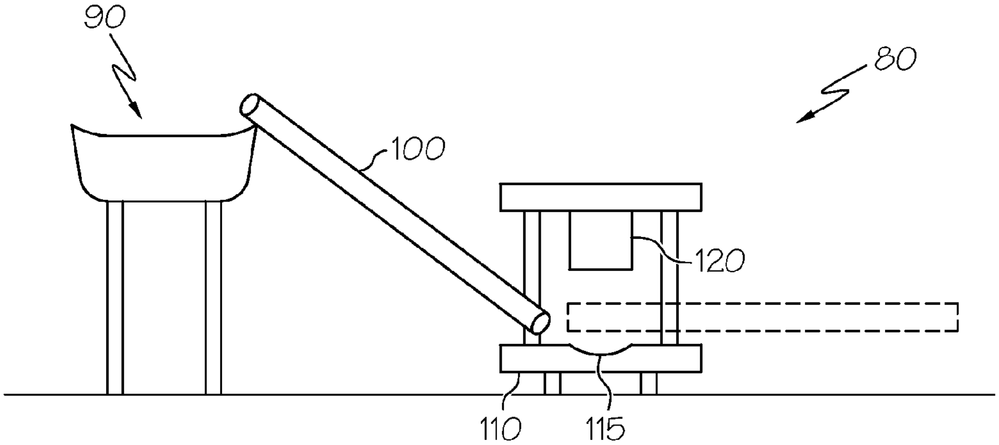
FIG. 5 is a side view of the eyeleting station.

Referring now to FIG. 5, the eyeleting station 80 includes a washer hopper 90, a washer transport 100, an eyeleting anvil 110, and an eyeleting head 120. The eyeleting anvil 110 has a washer shaped depression 115. The eyeleting head 120 is positioned over the eyeleting anvil 110. The washer transport 100 is positioned between the washer hopper 90 and the eyeleting anvil to allow for the transport of washers stored in the washer hopper 90 to the eyeleting anvil 110.

Figure 6:
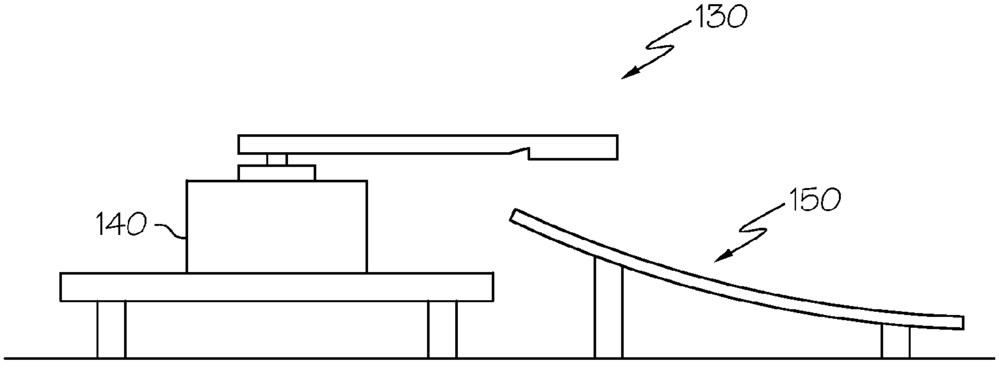
FIG. 6 is a side view of the unloading station.
Figure 7:
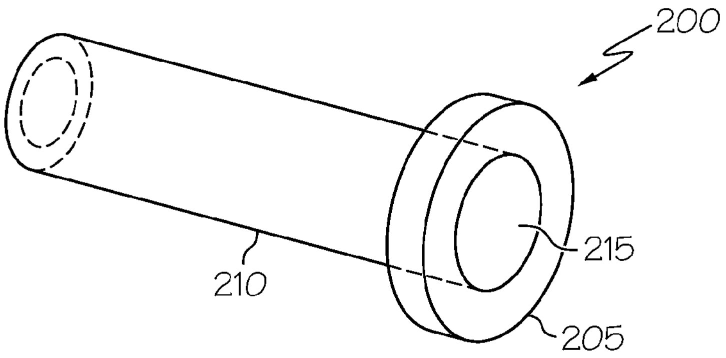
FIG. 7 is a side view of an eyelet.
Figure 8:
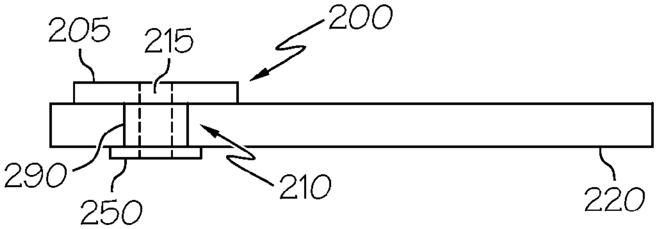
FIG. 8 is a side view of a hangtag having a one-piece eyelet.
Figure 9:
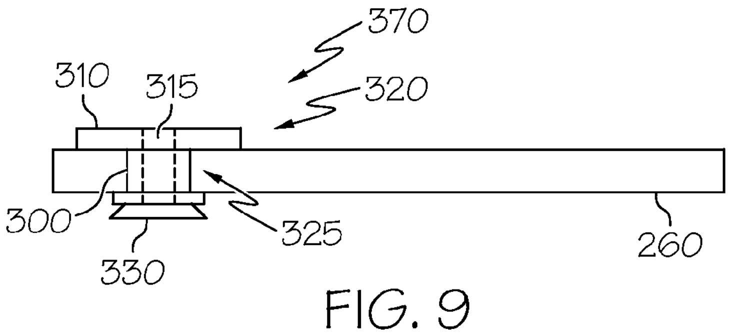
FIG. 9 is a side view of a hangtag having a two-piece eyelet.

Referring now to FIG. 6, the unloading station includes a second pick and place mechanism 140 and a delivery chute 150. The delivery chute 150 is located adjacent to the second pick and place mechanism 140. The second pick and place mechanism 140 is positioned to allow interaction with both the delivery chute 150 and the plurality of hangtag holders 31, 32, 33, 34.

The operation of the machine for punching an aperture through a hangtag and securing a two-piece eyelet to the same will now be explained. It should be noted that operations of the machine 1 not pertinent to the present invention are not described in detail herein.

Referring now back to FIGS. 1 and 2, a plurality of hangtags is loaded into the hangtag dispenser 50. In the exemplary embodiment of the machine 1 shown in FIGS. 1 and 2, the hangtag dispenser has been adjusted to accept rectangular hangtags having a length of 110 mm, a width of 55 mm, and a thickness of 0.4 mm. However, it is understood that the hangtag dispenser 50 may be adjusted a wide variety of hangtags having different sizes and shapes. Accordingly, it is understood that the machine 1 as a whole may be configured to process a wide variety of hangtags having sizes and shapes different than that of the exemplary hangtag described above.

The rotary platform 20 rotates clockwise until the first hangtag holder 31 is aligned with the loading station 40. Once aligned, the first pick and place mechanism 60 removes a single hangtag from the hangtag dispenser 50 and places the hangtag on the first hangtag holder 31. The first hangtag holder 31 secures the hangtag to the rotary platform 20. This series of operations will hereafter be referred to as "the Loading Process". The rotary platform 20 then rotates ninety degrees clockwise to advance first hangtag holder 31 into alignment with the punching station 70.

The second hangtag holder 32 is simultaneously advanced into alignment with the loading station as the rotary platforms 20 rotates ninety degrees clockwise to advance the first hangtag holder 31 into alignment with the punching station 70. As noted above, both the plurality of hangtag holders 31, 32, 33, 34 and the plurality of four stations 40, 70, 80, 130 are positioned every ninety degrees along the periphery of the rotary platform 20 with respect to the table center C. Therefore, the distances between each of the plurality of hangtag holders 31, 32, 33, 34 and each of the plurality of four stations 40, 70, 80, 130 are equal to one another. Accordingly, once the first hangtag holder 31 is aligned with the punching station 70, the remaining hangtag holders 32, 33, 34 will likewise be aligned with one of the remaining stations 40, 80, 130.

As shown in FIG. 4, when the first hangtag holder 31 is aligned with the punching station 70, the hangtag (shown in dashed lines) extends between the male punch unit 71 and female punch unit 72. In the exemplary embodiment of the machine shown in FIGS. 1 and 2, the male punch unit 71 and the female punch unit 72 have been adjusted to punch an aperture having a diameter of 3.5 mm. However, it is understood that the male punch unit 71 and the female punch unit 72 may be adjusted to punch an aperture having a wide variety of different diameters. With the hangtag extending between the male punch unit 71 and the female punch unit 72, the male punch unit 71 and the female punch unit 71 cooperate with one another to punch an aperture in the hangtag secured by the first hangtag holder 31. This series of operations will hereafter be referred to as "the Punching Process". Synchronously, the Loading Process is executed on the second hangtag holder 32. The rotary platform 20 then rotates ninety degrees clockwise to advance the first hangtag holder 31 into alignment with the eyeleting station 80. This rotation of the rotary platform 20 also advances the second hangtag holder 32 into alignment with the punching station 70, and the third hangtag holder 33 into alignment with the loading station.

As shown in FIG. 5, when the first hangtag holder 31 is aligned with the eyeleting station 80, the hangtag (shown in dashed lines) extends between the eyeleting head 120 and the eyeleting anvil 110. The eyeleting station 80 is provided with a plurality of eyelets and a plurality of washers. In the exemplary embodiment of the machine 1 shown in FIGS. 1 and 2, the eyeleting station 80 is provided with eyelets having a diameter of 3.5 mm, and the eyeleting station is able to produce this size eyelet within a tolerance of +/−1 mm. However, it is understood that the eyeleting station 80 may be adjusted to accept eyelets having a wide variety of different diameters, and that the eyeleting station 80 may be adjusted to increase or decrease the tolerance of the produced eyelets, if so desired.

The eyelets are fed directly to the eyeleting head 120, while the washers are stored in the washer hopper 90. The washer transport 100 transports a single washer from the washer hopper 90 to the eyeleting anvil 110. The washer shaped depression 115 found on the eyeleting anvil 110 temporarily retains the washer to the eyeleting anvil 110. With the hangtag extending between the eyeleting head 120 and the eyeleting anvil 110, the eyeleting head 120 drives the provided eyelet through the aperture created by the Punching Process in the hangtag secured by the first hangtag holder 31 and into the eyeleting anvil 110. Driving the eyelet into the eyeleting anvil 110 causes the eyelet to flare over the washer, thereby creating a two-piece eyelet secured to the hangtag. This series of operations will hereafter be referred to as "the Eyeleting Process". Synchronously, the Punching Process is executed on the second hangtag holder 32, and the Loading Process is executed on the third hangtag holder 33. The rotary platform 20 then rotates ninety degrees clockwise to advance the first hangtag holder 31 into alignment with the unloading station 130. This rotation of the rotary platform 20 also advances the second hangtag holder 32 into alignment with the eyeleting station 80, the third hangtag holder 33 into alignment with the punching station 70, and the fourth hangtag holder 34 into alignment with the loading station 60.

Once aligned, the second pick and place mechanism 140 removes the completed two-piece eyelet hangtag from the first hangtag holder 31 and places the completed hangtag onto the delivery chute 150. The delivery chute 150 guides the completed hangtag away from the machine 1 so that the completed hangtag may be collected for further processing. This series of operations will hereafter be referred to as "the Unloading Process". Synchronously, the Eyeleting Process is executed on the second hangtag holder 32, the Punching Process is executed on the third hangtag holder 33, and the Loading Process is executed on the fourth hangtag holder 34.

Once all processes are complete, the rotary platform 20 rotates ninety degrees clockwise until the first hangtag holder 31 is once again aligned with the loading station 60, thereby allowing the above discussed process of punching an aperture through a hangtag and securing a two-piece eyelet to the aperture to begin anew with the first hangtag holder 31. Because the hangtag holders 31, 32, 33, 34 are equal in number to the stations 40, 70, 80, 130, the process of punching an aperture in a hangtag and securing a two-piece eyelet to the aperture is a continuous one, as a hangtag holder aligned with and unloaded by the unloading station 130 is immediately moved into alignment with the loading station 40 upon the next ninety degree rotation of the transport platform 20, thereby allowing the process to immediately repeat itself without interruption.

While the exemplary embodiment of the machine 1 shown in FIGS. 1 and 2 has a plurality of four hangtag holders 31, 32, 33, 34 and a plurality of four processing stations 40, 70, 80, 130, it is envisioned that the machine 1 could easily be modified to have as many hangtag holders and processing stations as may be necessary to perform whatever series of operations that may be desired on a hangtag. For example, the machine 1 could be modified to have six processing stations and six hangtag holders. One of the additional stations could be a printing station for printing a logo or other desired pattern onto the hangtag, while the other additional station could be a laminating station for laminating the hangtag after the desired pattern has been printed onto the hangtag. It should be noted that altering the number of processing stations and hangtag holders would require altering the degrees at which the hangtag holders and stations are positioned along the periphery of the rotary platform 20 with respect to the table center C to ensure equal spacing between each of the processing stations and each of the hangtag holders. For example, if six hangtag holders and six processing stations are employed, the hangtag holders and processing stations would need to be positioned every sixty degrees along the periphery of the rotary platform 20 with respect to the table center C.

Figure 10:
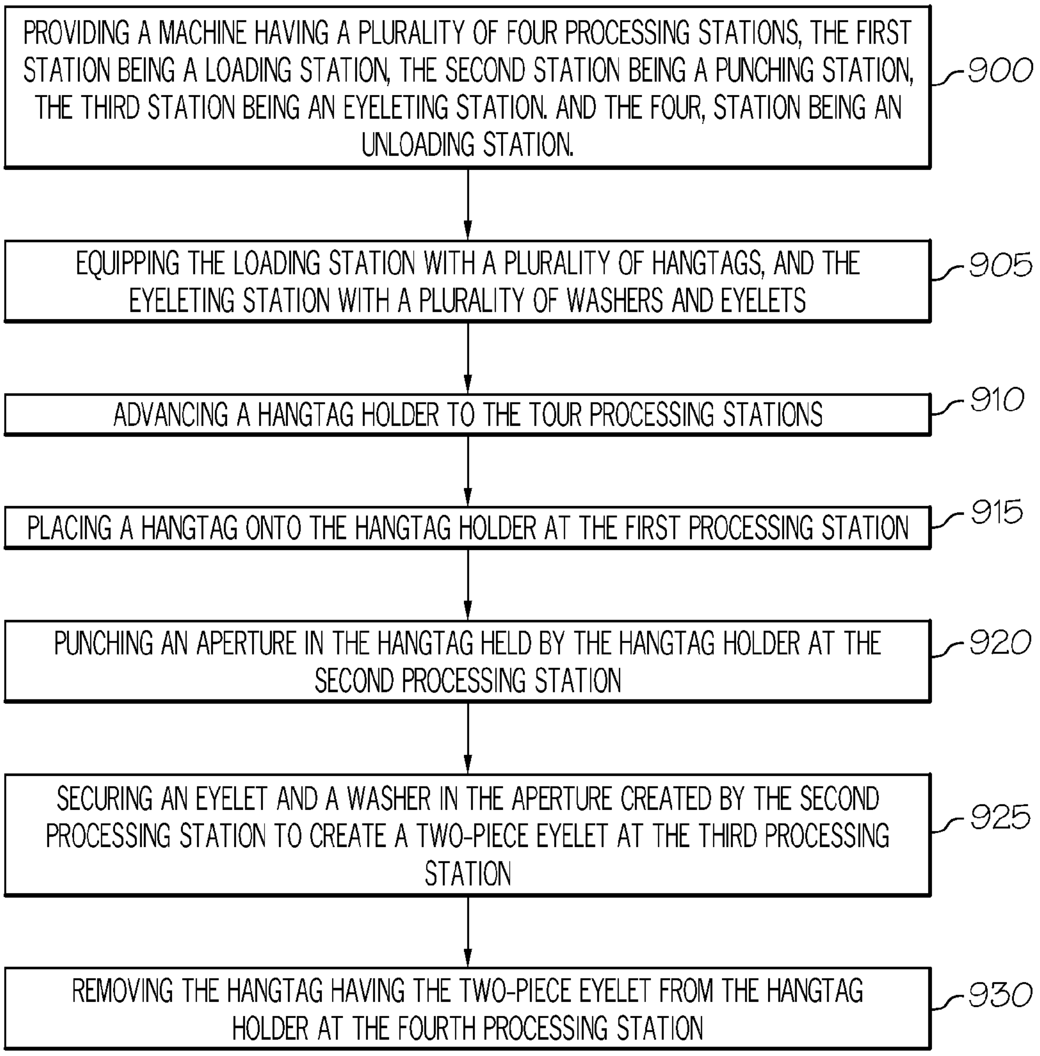
FIG. 10 is a block diagram setting forth an exemplary method of practicing the presently described invention.

Referring now to FIG. 10, a methodology for punching an aperture in a hangtag and securing a two-piece eyelet to the aperture is shown. The method begins at 900 where a machine is provided that has a plurality of four of four processing stations. The first station is a loading station, the second station is a punching station, the third station is an eyeleting station, and the fourth station is an unloading station. At 905, the loading station is provided with a plurality of hangtags, while the eyeleting station is provided with a plurality of eyelets and washers. The next step of the method occurs at 910, where a hangtag holder is advanced to the four processing stations. At 915, a hangtag is placed onto the hangtag holder at the first processing station. At 920, an aperture is punched into the hangtag held by the hangtag holder at the second processing station. At 925, an eyelet and a washer are secured to the aperture created by the punching station to create a two-piece eyelet at the third processing station. The method concludes at 930, where the hangtag having the two-piece eyelet is removed from the hangtag holder at the fourth processing station.

While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A machine for punching an aperture through a hangtag and securing a two-piece eyelet to the same, comprising:
  - a frame;
  - a table mounted to the frame, the table having a center;
  - a platform rotatably mounted to the center of the table;
  - a plurality of hangtag holders mounted to the platform just inside a periphery of the platform; and
  - at least four hangtag processing stations mounted to the table just outside the periphery of the platform; and
  - wherein each one of the at least four hangtag processing stations is positioned every ninety degrees along the periphery of the platform with respect to the center of the table.

2. The machine as defined in claim 1, wherein the plurality of hangtag holders comprises four hangtag holders.

3. A machine for punching an aperture through a hangtag and securing a two-piece eyelet to the same, comprising:
  - a frame;
  - a table mounted to the frame, the table having a center;
  - a platform rotatably mounted to the center of the table;
  - a plurality of hangtag holders mounted to the platform just inside a periphery of the platform; and
  - a plurality of hangtag processing stations mounted to the table just outside the periphery of the platform wherein the hangtag processing stations comprises a loading station, a punching station, an eyeleting station, and an unloading station.

4. The machine as defined in claim 1, wherein the platform is circular.

5. The machine as defined in claim 1, wherein the two-piece eyelet has a diameter between 2.5-5 mm.

6. The machine as defined in claim 1, wherein the eyelet has a diameter tolerance of +/−1 mm.

7. The-machine as defined in claim 1, wherein the hangtag has a length between 70-140mm, a width between 20-90 mm, and a thickness between 0.2-0.8 mm.

8. The machine as defined in claim 3, wherein the plurality of hangtag processing stations are positioned every ninety degrees along the periphery of platform.

9. The machine as defined in claim 3, wherein the loading station includes a hangtag dispenser and a first pick and place mechanism.

10. The machine as defined in claim 9, wherein the first pick and place mechanism is located adjacent to the hangtag dispenser.

11. The machine as defined in claim 3, wherein the punching station includes a male punch unit and a female punch unit.

12. The machine as defined in claim 11, wherein the male punch unit and the female punch unit are adjustable to create apertures of different sizes.

13. The machine as defined in claim 3, wherein the eyeleting station includes a washer hopper, a washer transport, an eyeleting anvil, and an eyeleting head.

14. The machine as defined in claim 13, wherein the eyeleting anvil has a washer shaped depression.

15. The machine as defined in claim 13, wherein the eyeleting head is positioned over the eyeleting anvil.

16. The machine as defined in claim 3, wherein the unloading station includes a second pick and place mechanism and a delivery chute.

17. The machine as defined in claim 16, wherein the second pick and place mechanism is position to allowed interaction with the delivery chute and the plurality of hangtag holders.

18. The machine as defined in claim 2, wherein the four hang tag stations include a loading station, a punching station, an eyeleting station, and an unloading station.

* * * * *